United States Patent
Landler et al.

(10) Patent No.: US 10,526,183 B2
(45) Date of Patent: Jan. 7, 2020

(54) HOLDING DEVICE FOR HOLDING A CONTAINER

(71) Applicant: KRONES AG, Neutraubling (DE)

(72) Inventors: Bruno Landler, Neutraubling (DE); Matthias Kraus, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 15/579,895

(22) PCT Filed: Mar. 22, 2017

(86) PCT No.: PCT/EP2017/056762
§ 371 (c)(1),
(2) Date: Mar. 5, 2018

(87) PCT Pub. No.: WO2017/162710
PCT Pub. Date: Sep. 28, 2017

(65) Prior Publication Data
US 2018/0179041 A1 Jun. 28, 2018

(30) Foreign Application Priority Data
Mar. 22, 2016 (DE) ........................ 10 2016 105 265

(51) Int. Cl.
*B67C 3/24* (2006.01)
*B65G 47/86* (2006.01)
*B65G 47/90* (2006.01)

(52) U.S. Cl.
CPC ............. *B67C 3/242* (2013.01); *B65G 47/847* (2013.01); *B65G 47/90* (2013.01); *B65G 2201/0247* (2013.01)

(58) Field of Classification Search
CPC ........ B25J 15/0206; B25J 15/02; B25J 15/04; B67C 3/242; B65G 47/847; B65G 47/90; B65G 2201/0247
See application file for complete search history.

(56) References Cited

U.S. PATENT DOCUMENTS 3,945,676 A * 3/1976 Asamoto ................ B25J 15/022
294/106
4,185,866 A * 1/1980 Wittwer ............... B25J 15/0206
294/195

(Continued)

FOREIGN PATENT DOCUMENTS

DE 102012218204 4/2014
DE 102014116004 2/2016
(Continued)

*Primary Examiner* — Stephen A Vu
(74) *Attorney, Agent, or Firm* — Haynes and Boone, LLP

(57) ABSTRACT

A holding device for holding a container, for example for holding a container in a transport device of a beverage filling plant is described. The holding device includes a fastening part and two gripping arms, which are pivotably connected to the fastening part and can be brought into a closed position in order to hold the container and can be brought into an open position in order to insert and remove the container. A preloaded elastic bow is disposed between the gripping arms, and the elastic bow can be brought into a first position, in which the gripping arms are in the open position, and into a second position, in which the gripping arms are in the closed position. The preload of the elastic bow in the first position holds the gripping arms in the open position and the preload of the elastic bow in the second position holds the gripping arms in the closed position.

6 Claims, 2 Drawing Sheets

(56) References Cited

U.S. PATENT DOCUMENTS

| | | | | |
|---|---|---|---|---|
| 4,304,433 A | * | 12/1981 | Langowski | ............. E21B 19/14 |
| | | | | 294/106 |
| 4,540,212 A | * | 9/1985 | Inaba | ................... B25J 15/0206 |
| | | | | 294/106 |
| 5,884,952 A | * | 3/1999 | Chadwick | .............. B25J 15/022 |
| | | | | 294/115 |
| 2014/0319301 A1 | | 10/2014 | Gruson | |

FOREIGN PATENT DOCUMENTS

| JP | 2001287795 | 10/2001 |
|---|---|---|
| WO | WO 2009/118579 | 10/2009 |

* cited by examiner

HOLDING DEVICE FOR HOLDING A CONTAINER

CROSS REFERENCE TO RELATED APPLICATIONS

This application is a national stage of International Application No. PCT/EP2017/056762, filed Mar. 22, 2017, which claims priority from German Patent Application No. 10 2016 105 265.5 filed on Mar. 22, 2016 in the German Patent and Trademark Office, the disclosures of which are incorporated herein by reference in their entirety.

BACKGROUND

Technical Field

The present invention relates to a holding device for holding a container, for example for holding a container on a transport device in a beverage filling plant.

Related Art

Holding devices for holding containers in beverage filling plants are known from the state of the art. A general distinction is made between holding devices which support the container in its base area, in what is also known as "base handling", and other known holding devices which hold the container in its neck area, for example by gripping it below a neck ring. The latter method is also known as "neck handling".

When the containers are held in the neck area, the containers to be held are for example held by means of gripping arms which are arranged such that they can be displaced or pivoted. In this case, the gripping arms are actively controlled—i.e. opened and closed—by means of actuators, for example pneumatic cylinders or electrical actuators, or by means of a mechanical guide.

In most cases, holding devices for holding a container are disposed on moving parts of container transport devices, which serve at least to move or transport the container. Elaborate contacting elements therefore need to be provided between stationary and moving parts of the container transport device, in order to enable active control of the gripping arms. This increases the complexity of such container transport devices, along with their manufacturing and operating costs.

It is further known to bring grippers, or their gripping arms, into the closed state by introducing a workpiece, wherein the workpiece presses an actuator when it is introduced into the holding device, and the gripping arms are thereby closed. As is indicated by DE 10 2008 020 489 A1 and DE 38 02 838 A1, such holding devices are designed in a mechanically complex and expensive manner, and consist of a large number of parts.

From DE 10 2012 218 204 A1, a single-piece clamp for gripping containers is known. The clamp has a fixed position. In order for it to grip a container, it is necessary to push the container into the clamp. The stiff gripping arms are thereby spread apart, which means that the container must be displaced against the closing force of the gripping arms that arises from the spreading of the clamp. This exerts a large force on the containers as they are inserted, and such holding devices are therefore unsuitable for gripping or holding fragile and/or easily deformable or thin-walled containers. At the least, there is a tendency for the surfaces of the applicable containers to be scratched, thus lowering the quality of the containers.

SUMMARY

An improved holding device for holding a container, for example for holding a container on a transport device in a beverage filling plant is described.

Accordingly, a holding device for holding a container, for example for holding a container in a transport device of a beverage filling plant, is proposed, including a fastening part and two gripping arms, which are pivotably connected to the fastening part and can be brought into a closed position in order to hold the container, and can be brought into an open position in order to insert and remove the container, wherein a preloaded elastic bow is disposed between the gripping arms, and the elastic bow can be brought into a first position, in which the gripping arms are in the open position, and into a second position, in which the gripping arms are in the closed position. The preload of the elastic bow in the first position holds the gripping arms in the open position and the preload of the elastic bow in the second position holds the gripping arms in the closed position.

Due to the fact that the preload of the bow in the first position holds the gripping arms in the open position and the preload of the bow in the second position holds the gripping arms in the closed position, when the gripping arms are held in the open position a container to be held can be safely inserted, or a container to be removed can be safely removed from the holding device, and in addition, if the gripping arms are held in the closed position, the container to be held can be held by the holding device unaided, i.e. without the need to provide the holding device with separate special locking devices for holding the gripping arms in the open and/or the closed position. Furthermore, it is possible to dispense with additional devices for controlling the position of the gripping arms. In particular, it is possible to dispense with drive elements, actuator units and control devices, together with their active control. The holding device can thereby be designed to be particularly simple and/or have a low weight, and can be correspondingly inexpensively produced. Because there are no connecting areas between the control elements and the gripping arms, there are also no gaps or crevices that are difficult to clean and in which contamination can accumulate. The holding device can thus also be cleaned particularly easily. As a result, it can also be used for applications with exacting hygiene requirements, such as the production of foodstuffs or pharmaceutical products.

Additionally, the handover and reception of a container to be held can take place in an extremely gentle manner, typically with almost no force, since the container does not need to be pressed into or pulled out of the holding device against the preload of gripping arms that are permanently held in the closed position. Instead, the container that is to be gripped can be moved into the device when the preload of the bow in the first position holds the gripping arms in the open position, and the container that is moved into the device can be gripped or held when the preload of the bow in the second position holds the gripping arms in the closed position.

Furthermore, by means of the use of a holding device on a transport or treatment device for transporting and/or treating a container which has the holding device, such a transport or treatment device can have a simple design and be cost-effectively operated, since, firstly, the masses that must be displaced on the transport or treatment device can be kept low, and secondly it is possible to dispense with elaborate contacting elements, in particular for controlling the gripping arms, such as electrical or optical cabling and/or pneumatic tubing.

In one embodiment, the first and second positions are stable positions, wherein when the elastic bow is elastically deformed from one of the two positions in the direction of the other position, in each case it spontaneously adopts the other position when a particular degree of deformation at which it will switch its position is exceeded. By this means, a self-switching, generally self-opening and/or self-closing holding device can be provided. In other words, by this means a passive holding device is formed, which does not use an active actuating device to change the position of the gripping arms between the open position and the closed position. In addition, due to the two stable positions of the elastic bow, the gripping arms are in each case held in a stable manner in the open and closed positions, without the need for locking devices or similar. The elastic bow thus functions in the manner of an elastic catch spring, which can change between two stable positions.

In order for the elastic bow to have elastic properties, a least the elastic bow includes an elastic, for example highly elastic material, such as a plastic or a metal alloy.

In order to enable the gripping arms to be particularly securely held in the open and the closed positions, in one embodiment the elastic bow in the first position is preloaded in a first preload direction, and in the second position is preloaded in a second preload direction, wherein the first preload direction and the second preload direction point in substantially opposite directions.

In another embodiment, the elastic bow is provided in the form of a spring, particularly a catch spring, for example a leaf spring. By this means the elastic bow can have a high preload in the first and/or the second position, so that the gripping arms are held securely in the open or closed position. In addition, only a slight force is needed to displace the elastic bow from the first position into the second position and vice versa. This further enables the bow to be produced particularly simply and inexpensively.

In order to enable the elastic bow to adopt the first position and the second position, i.e. to be displaceable between these positions and/or elastically deformable, in some embodiments a connecting area is provided in each case between the fastening part and each gripping arm, wherein the connecting area is part of the elastic bow. In other words, the elastic bow is then formed from the two connecting areas and a middle bow.

In an advantageous further development, the connecting area between the fastening part and a gripping arm is in each case provided by means of a flexible web, for example in the form of a living hinge. This enables the elastic bow to have good flexibility. In addition, due to a preloading of the webs based on their own elastic deformation, the webs can thereby firstly contribute to the preloading of the bow and secondly contribute to the stable positioning of the elastic bow in the first and/or the second position. For particularly simple manufacturing, and/or in order to provide particularly uniform elastic deformation of the connecting area and the bow, these typically include the same material, and are generally formed in a single piece.

It can be particularly advantageous if the elastic bow with the connecting areas and the fastening part forms a frame, for example a continuous frame, wherein a hollow formed by the frame is typically enclosed.

In various embodiments, the fastening part, the gripping arms, the connecting areas and the elastic bow are formed as a single piece. By this means the holding device can be manufactured in a particularly simple and cost-effective manner, generally in a single production step. In addition, the holding device is then particularly easy to clean, and thus ideal for applications with exacting hygiene requirements, such as antiseptic systems.

In order to enable particularly cost-effective and efficient manufacture, the holding device is typically formed in a single production step, for example by means of injection molding, selective laser sintering, selective laser melting, milling, laser or water jet cutting, stereolithography or powder injection molding.

For secure and accurate positioning and holding, in the holding device, of the container that is to be held, the container that is held in the holding device can be held by the elastic bow and the two gripping arms, wherein generally the elastic bow and each of the gripping arms form in each case exactly one contact area with the container that is held. In other words, the container that is held is in contact with the holding device in at least three contact areas. Alternatively, several contact areas can be provided between the container that is held and the elastic bow and/or the gripping arms, or the container can be held only by the two gripping arms, wherein the container forms at least one contact area with each gripping arm.

In several embodiments, the elastic deformation for deforming the elastic bow from the first position into the second position can be effected by a direct application of force on the elastic bow. In some embodiments, the force for deforming the elastic bow from the first position is applied to the elastic bow by the container. By this means, the position of the gripping arms when the container is transferred to the holding device can be brought passively to the closed position due to the insertion of the container.

In certain embodiments, the elastic deformation for deforming the elastic bow from the second position into the first position can be effected by a bending moment acting on the elastic bow via the gripping arms. Typically, the bending moment is created by a force applied by the container to the gripping arms, for example when the container is removed from the holding device. In this manner the gripping arms can be displaced passively from the closed position into the open position.

A particularly simple design of the holding device can be enabled if the container to be held serves as an actuator to change between the closed position for holding the container and the open position for inserting and removing a container, wherein the container can in various embodiments be pushed against the elastic bow in order to close the gripping arms, and pulled out of the holding device to open the gripping arms. By this means it can be ensured that the container is held securely after insertion into the holding device, and the holding device opens and releases the container when the container is removed. In other words, the holding device, i.e. the position of the gripping arms, is controlled by the container, in particular by the insertion and removal of the container.

BRIEF DESCRIPTION OF THE FIGURES

Further embodiments of the invention are more fully explained by the description below of the figures.

DETAILED DESCRIPTION

Examples of embodiments are described below with the aid of the figures. In the figures, elements which are identical or similar, or have identical effects, are designated with identical reference signs, and in order to avoid redundancy repeated description of these elements is in part dispensed with.

Figure 1:
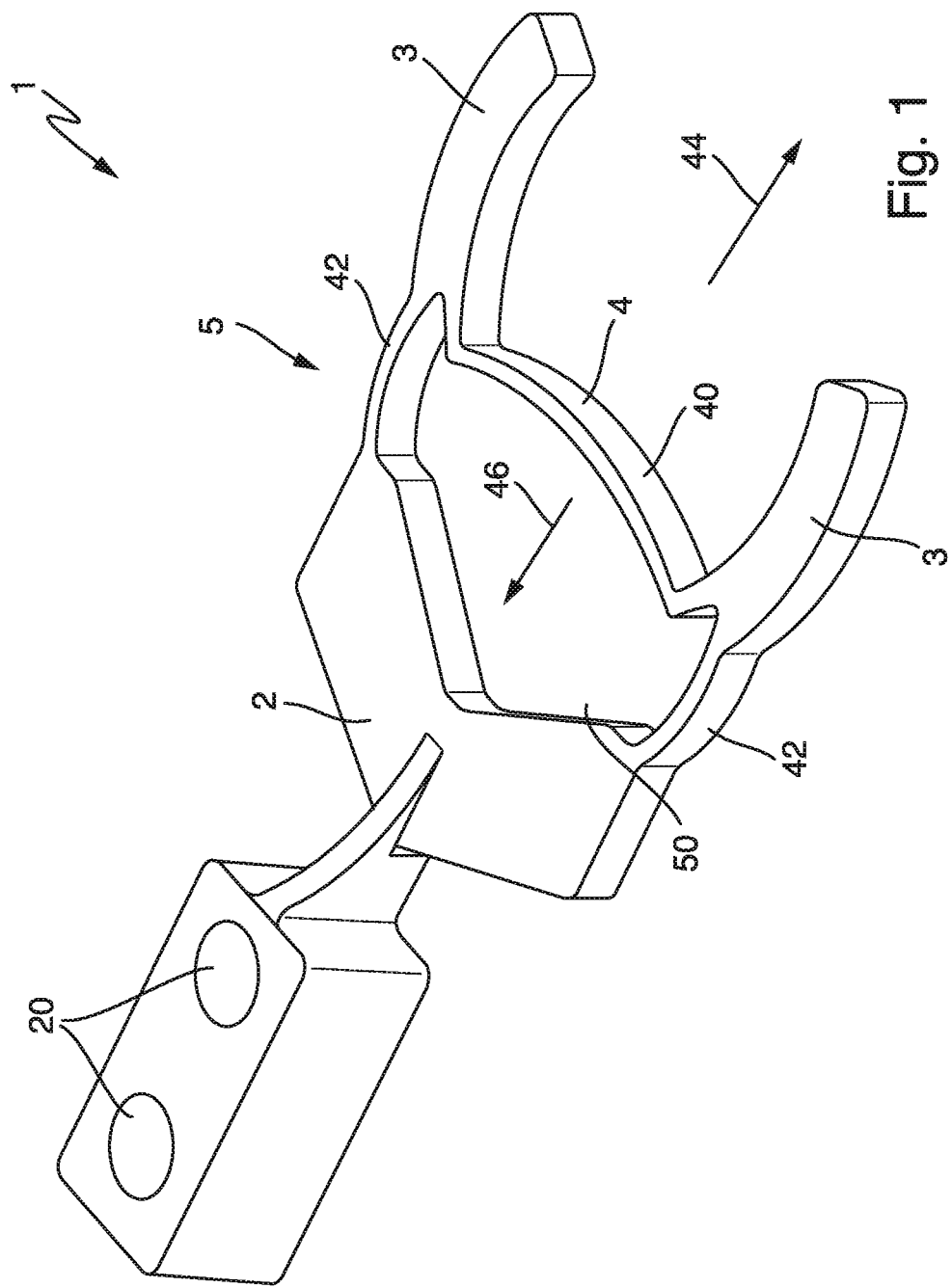
FIG. 1 is a schematic perspective side view of a holding device for holding a container, in which the gripping arms of the holding device are held in an open position by means of an elastic bow.

FIG. 1 shows a schematic perspective side view of a holding device 1 for holding a container (which is not shown) in a beverage filling plant. The holding device 1 serves, for example, to transport the container by its neck area through a beverage filling device, and the holding device 1 can be disposed, for example, on a transport starwheel, a rotary filler and/or a capper, in order in each case to hold the containers that are to be treated or transported, and/or to transfer them to a subsequent transport or treatment device.

The holding device 1 has two gripping arms 3, which are provided for the actual holding of the container, and which, in a closed position, hold the container. The gripping arms 3 are pivotably connected to a fastening part 2, such that the gripping arms 3 can be brought from a closed position, in which the container is held, into an open position, in which the container can be removed from the holding device 1 and a further container can be inserted into the holding device 1 for accommodation within it. The fastening part 2 has fastening points 20 for fastening the holding device 1 to one of the above-mentioned transport or treatment devices of the beverage filling plant.

Spaced apart from the fastening points 20, two connecting areas 42 in the form of thin-walled webs are connected to the fastening part 2. The connecting areas 42 can also be designed as living hinges.

Via each of the connecting areas 42, a gripping arm 3 for gripping the container that is to be held is connected with the fastening part 2. The connecting areas 42, which are designed as webs, thereby function as an elastic joint, so that the gripping arms 3 are pivotably attached to the fastening part 2. An elastic bow 4 is disposed between the gripping arms 3. This bow 4 is formed as a thin-walled leaf spring, and, in a state in which it is preloaded towards a first preload direction 44, is in a first stable position. The position of the bow 4 determines the position of the gripping arms 3. Because the bow 4 is in the first stable position, the gripping arms 3 are in the open position for inserting and removing the container.

In the embodiment that is shown in FIG. 1, the connecting areas 42 function as a part of the bow 4, so that this bow 4 consists of the connecting areas 42 and a middle bow 40. The connecting areas 42 and the middle bow 40 have substantially the same cross-sectional areas.

Additionally, the bow 4 with the connecting areas 42 and the fastening part 2 form a frame 5, such that a hollow 50 is enclosed by the frame 5. This frame shape enables good elastic deformability of the bow 4, and at the same time a stable holder can be provided for the transport of the container that is to be transported.

Figure 2:
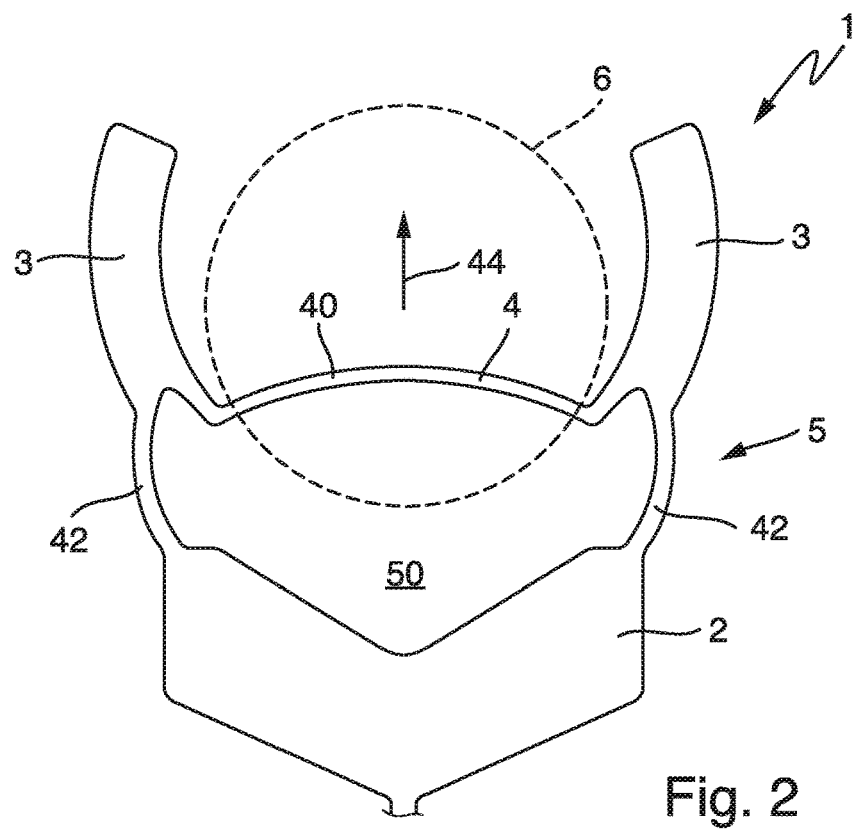
FIG. 2 is a schematic plan view of the holding device from FIG. 1.

FIG. 2 shows schematically a plan view of the holding device 1 from FIG. 1. In this representation, the bow 4 is again in the first stable position. The middle bow 40 is bowed towards the first preload direction 44. By this means, the gripping arms 3 connected with the bow 4 are held apart from each other, so that the spacing between them is greater than the diameter of a container 6 that is to be held. For a clearer view, the container 6 is shown schematically in a position which it would adopt in a closed state of the holding device 1. Because the diameter of a container 6 that is to be held is smaller than the spacing between the two gripping arms 3, the container 6 can be inserted into the holding device 1, or removed from it, without encountering resistance from the gripping arms 3.

Figure 3:
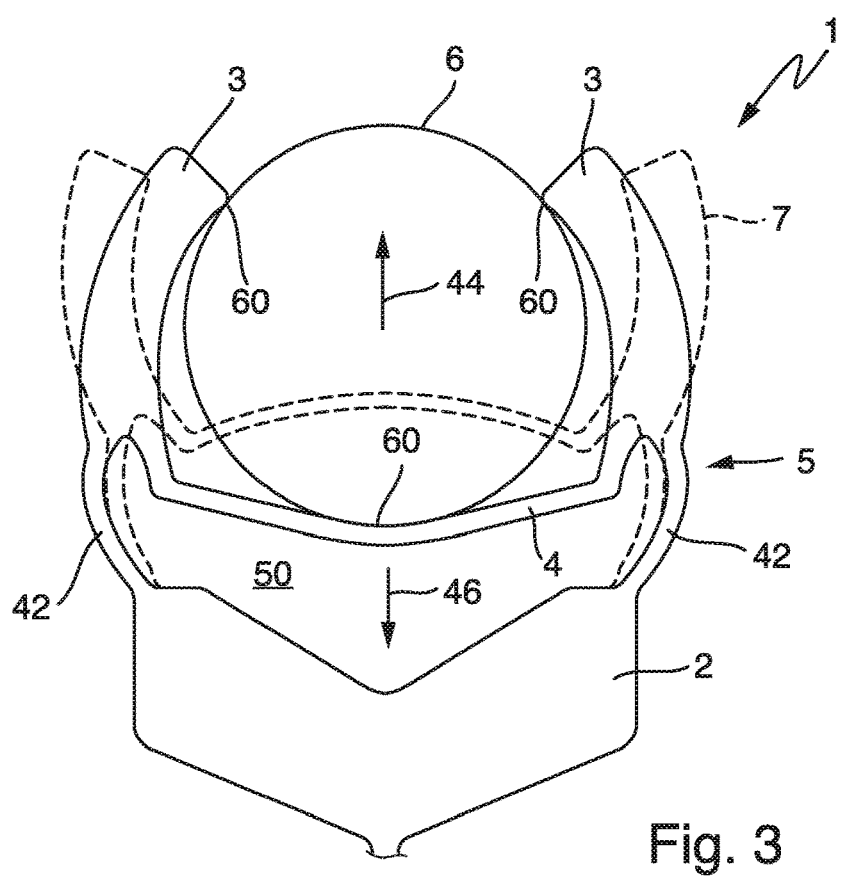
FIG. 3 is a schematic plan view of the holding device from FIG. 1 in a state in which the gripping arms are held in a closed position by means of the elastic bow.

FIG. 3 shows schematically a plan view of the holding device 1 from FIGS. 1 and 2, in a state in which the gripping arms 3 are in a closed position. In this state, the elastic bow 4 is preloaded in a second stable position towards the second preload direction 46, which is in the opposite direction from the first preload direction 44.

In this case, the middle bow 40 is bowed towards the second preload direction 46. A container 6 that is held by the holding device 1 is thereby held by the gripping arms 3 and the elastic bow 4. The container 6 thus forms contact areas 60 with the gripping arms 3 and the elastic bow 4. Exactly three contact areas 60 are generally provided, namely one contact area 60 with each gripping arm 3 and one contact area 60 with the middle bow 40. In this manner it is possible to form defined contact areas 60, which then provide the container with a defined manner of holding, and also achieve a defined manner of insertion and removal.

Alternatively, the container 6 can be held by the two gripping arms 3 only. These accordingly form two contact areas 60.

To enable a better comparison between the first position of the bow 4 and the second position of the bow 4, and the positions of the gripping arms 3 that result from each of these positions, the holding device 1 in the open position that is shown in FIG. 2 is represented schematically in FIG. 3 by a dashed line 7.

In order to change from the open position of the gripping arms 3, which is shown in FIG. 2, to the closed position of the gripping arms 3, which is shown in FIG. 3, the elastic bow 4 must be brought from the first position to the second position. When a force is applied to the elastic bow 4 towards the second preload direction 46, it is elastically deformed towards the second preload direction 46. When the elastic bow 4 has reached a particular degree of deformation at which it will switch its position, it snaps spontaneously into the second stable position. The force that is applied to the elastic bow 4 can generally be applied directly via the container 6 that is inserted. When inserted in the holding device 1, the container 6 presses the bow 4 towards the second preload direction 46, so that the elastic bow 4 undergoes an elastic deformation, and when the degree of deformation at which it will switch its position is exceeded, it snaps into the second stable position.

In order to change from the closed position of the gripping arms 3, which is shown in FIG. 3, to the open position of the gripping arms 3, which is shown in FIG. 2, the elastic bow 4 must be brought from the second position to the first position. When a force is applied to the elastic bow 4 towards the first preload direction 44, it is elastically deformed towards the first preload direction 44. When the elastic bow 4 has reached the particular degree of deformation at which it will switch its position, it snaps spontaneously into the first stable position. The force that is applied to the elastic bow 4 can generally be applied by a bending moment created by the removal of the container 6 from the holding device 1, acting on the bow 4 via the gripping arms 3. As it is removed, the container 6 that is to be removed pushes the two gripping arms 3 apart. The gripping arms 3, which are thereby pushed apart, act as lever arms on the elastic bow 4, so that it is subject to a bending moment, and thereby to an elastic deformation towards the first preload direction 44. When the degree of deformation at which it will switch its position is exceeded, it snaps into the second stable position.

The elastic bow 4 thus functions in the manner of an elastic catch spring, which can switch between two stable positions.

To the extent applicable, all individual features described in the example embodiments can be combined with each other and/or exchanged, without departing from the field of the invention.

The invention claimed is:

1. A holding device for holding a container, comprising:
   a fastening part;
   two gripping arms that are pivotably connected to the fastening part and configured to be brought into a closed position to hold the container and into an open position to insert and remove the container;
   a fastening point configured to fasten the holding device to a transport or treatment device; and
   an elastic bow disposed between the two gripping arms, wherein:
   the elastic bow is configured to be brought into a first position, in which the two gripping arms are in the open position, and into a second position, in which the two gripping arms are in the closed position, and
   a preload of the elastic bow in the first position holds the two gripping arms in the open position and a preload of the elastic bow in the second position holds the two gripping arms in the closed position.

2. The holding device of claim 1, further comprising a connecting area disposed between the fastening part and each of the two gripping arms, wherein the elastic bow comprises the connecting area and a middle bow.

3. The holding device of claim 1, wherein:
   when the elastic bow is elastically deformed from the first position in a direction of the second position, the elastic bow adopts the second position when a degree of deformation at which the elastic bow will switch its position is exceeded; or
   when the elastic bow is elastically deformed from the second position in a direction of the first position, the elastic bow adopts the first position when a degree of deformation at which the elastic bow will switch its position is exceeded.

4. The holding device of claim 1, wherein the elastic bow in the first position is preloaded in a first preload direction, and in the second position is preloaded in a second preload direction, and the first preload direction and the second preload direction point in substantially opposite directions.

5. The holding device of claim 2, wherein the fastening part, the two gripping arms, the connecting area, and the elastic bow are formed as a single piece.

6. A holding device for holding a container, comprising:
   a fastening part;
   two gripping arms that are pivotably connected to the fastening part and configured to be brought into a closed position to hold the container and into an open position to insert and remove the container;
   an elastic bow disposed between the two gripping arms, wherein:
   the elastic bow is configured to be brought into a first position, in which the two gripping arms are in the open position, and into a second position, in which the two gripping arms are in the closed position, and
   a preload of the elastic bow in the first position holds the two gripping arms in the open position and a preload of the elastic bow in the second position holds the two gripping arms in the closed position; and
   a connecting area disposed between the fastening part and each of the two gripping arms, wherein the elastic bow comprises the connecting area and wherein the connecting area comprises a flexible web.

* * * * *